United States Patent [19]

Ritze

[11] Patent Number: 4,615,989
[45] Date of Patent: Oct. 7, 1986

[54] OPTICAL QUALITY COLORED GLASS

[75] Inventor: Willy Ritze, Mainz-Finthen, Fed. Rep. of Germany

[73] Assignee: Schott Glaswerke, Mainz, Fed. Rep. of Germany

[21] Appl. No.: 724,091

[22] Filed: Apr. 17, 1985

[30] Foreign Application Priority Data

Apr. 18, 1984 [DE] Fed. Rep. of Germany ....... 3414682

[51] Int. Cl.$^4$ .......................... C03C 3/247; C03C 3/19; C03C 3/17; C03C 3/068
[52] U.S. Cl. ....................................... 501/44; 501/47; 501/48; 501/73; 501/78
[58] Field of Search ...................... 501/44, 47, 48, 73, 501/78

[56]  References Cited

U.S. PATENT DOCUMENTS

| | | | |
|---|---|---|---|
| 3,923,527 | 12/1975 | Matsuura et al. ..................... | 501/48 |
| 4,110,245 | 8/1978 | Yamashita ............................. | 501/48 |
| 4,217,382 | 8/1980 | Toratani ................................ | 501/47 |
| 4,297,142 | 10/1981 | Ritze ..................................... | 501/77 |
| 4,303,298 | 12/1981 | Yamashita ............................. | 501/48 |

FOREIGN PATENT DOCUMENTS 29-26721 11/1980 Fed. Rep. of Germany .
3242513 6/1984 Fed. Rep. of Germany .

Primary Examiner—Mark L. Bell
Attorney, Agent, or Firm—Haight & Associates

[57] ABSTRACT

An optical CuO-bearing, alkali- and alkaline-earth rich phosphate glass with relatively high elongation (at 20°–300° C. from $110 \times 10^{-7}$ grd$^{-1}$ to $138 \times 10^{-7}$ grd$^{-1}$) and a transformation range $\leq 380°$ C., with substantially improved transmission in the UV to blue range of the spectrum (UV-transmission at $\lambda = 350$ nm between $\geq 69\%$ and $\geq 83\%$) and a very strong absorption in the red region of the spectrum (IR-absorption at $\lambda = 700$ nm between $\leq 2\%$ and $\leq 12\%$), consisting essentially of the following synthesis/composition, in wt. %: $P_2O_5$ 65–70%; $SiO_2$ 0–0.75%; $B_2O_3$ 0–2%; $A_2O_3$ 2.5–6%; $R_2O$ (alkali metal oxides) 11–17%; BaO 3–9.5%; $CeO_2$ 0.45–2.0%; CuO 2.55–6.55%; Cl$^-$ 0.15–0.75%; F$^-$ 0.25–1.50%; refining agent 0.10–2.00% with $\Sigma CeO_2 + Al_2O_3 + BaO + CuO \geq 8.5$ and $\Sigma R_2O = F^- + Cl^- \geq 21.5$; optionally further containing CaO, MgO, SrO, ZnO and/or CdO.

15 Claims, 1 Drawing Figure

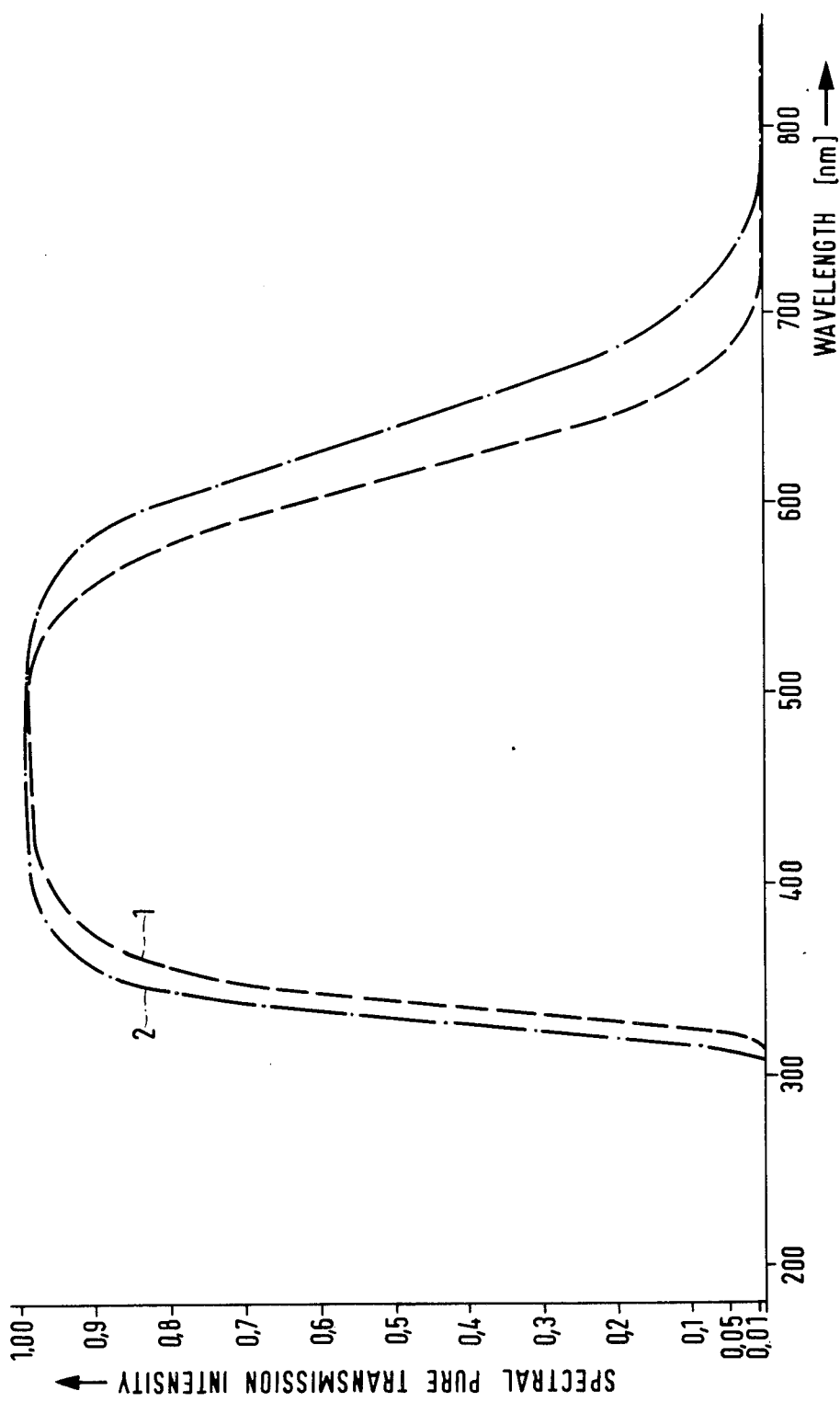

OPTICAL QUALITY COLORED GLASS

DESCRIPTION OF THE INVENTION

1. Technical Field of the Invention

This invention relates to a phosphate glass rich in alkali and alkaline earth content with a relatively high elongation and a low devitrification tendency, to serve as a base glass for the production of highly-selective CuO color-filter glasses. Due to its low viscosity and associated elasticity properties, such a glass system satisfies the demands for a glass system of good optical quality capable of being continuously deformed and passed over a movable band cooling system.

2. Background Art

Alkali metal or alkaline earth metal phosphate glasses for use in colored optical filters have been described, e.g. see German Offen. No. DE 32/42513 of June 7, 1984 assigned to Schott Glaswerke. Various types of optical colored and filter glasses and their usages have been described, e.g. see W. Ritze, U.S. Pat. No. 4,297,142 and German Offen. No. DE 2926721 of Nov. 13, 1980. Such prior art optical colored and filter glasses generally deviate from the ideal absorption/transmission spectra of copper phosphate solutions known in inorganic chemistry and are difficult to prepare in large size melts due to limited chemical stability and unsuited elasticity properties.

DISCLOSURE OF THE INVENTION

Accordingly, it is a general object of the present invention to provide a substantially improved transmissivity in the UV to blue ranges of the spectrum.

Another object of the present invention is to provide very high absorption in the red spectral range.

A further object of the present invention is to provide a relatively high elongation and a low devitrification tendency.

An additional object of the present invention is to provide a glass system of good optical quality capable of being continuously deformed and passed over a movable band cooling system without raising technical problems.

A more particular object of the present invention is to provide transmission and absorption characteristics found in the CuO-colored pure phosphate solutions in known inorganic chemistry.

Compared with the known Cu-phosphate glass short-pass filters the glass according to the invention shows a substantially improved transmissivity in the UV to blue ranges of the spectrum and a very high absorption in the red spectral range. The glass according to the invention thereby extends the range of application of known copper-phosphate glasses.

Upon study of the specification and appended claims, further objects, features and advantages of the present invention will become more fully apparent to those skilled in the art to which this invention pertains.

BRIEF DESCRIPTION OF THE DRAWING

FIG. 1 represents an illustrative transmission curve over the entire spectral application range of glasses according to this invention.

BEST MODE FOR CARRYING OUT THE INVENTION

Briefly, the above and other objects, features and advantages of the present invention are attained in one aspect thereof by providing an improved optical CuO-containing phosphate glass with an extremely high content of alkali oxides in combination with additions of fluorine and chlorine. While not wishing to be bound by any theory of the invention, chemical durability appears to be stabilized essentially on the basis of a tie-in of $Al_2O_3$—$CeO_2$—$BaO$—$CuO$ and thereby be raised to a meaningful degree.

As far as transmissivity is concerned, the presently preferred glasses of the present invention approach the absolute transmission and absorption characteristics found in CuO-colored pure phosphate solutions known in inorganic chemistry. With the colored glass according to this invention, the highest transmission or absorption characteristics are generally achieved for the spectral range of 350 nm, 400 nm, 450 nm, 475 nm, 694 nm and 850 nm. The transmission curve can be precisely adjusted during production to $\pm 1.0\%$ in the given spectral range.

Presently preferred are those glasses according to this invention which are characterized in that, with 2.75–5.50 wt. % CuO in a 2 mm thick filterglass, UV-transmission at $\lambda = 350$ nm can be maintained between $\geq 69\%$ and $\geq 83\%$; the transmissivity difference of the two color concentrations at $\lambda = 450$ nm is only 1% and does not fall below a transmission of 90%; and the absorption at wavelength $\lambda = 700$ nm increases from $\leq 12\%$ up to $\leq 2.0\%$.

The glass-production technology properties of this filterglass had to be so modified that a relatively high elongation can be achieved by a reason of adequate elasticity behavior under normal processing conditions, more particularly by means of lowering the glass transformation temperature range (Tg).

Presently preferred are those glasses according to this invention which are characterized in that the transformation range (Tg) is lower than 380° C. when elongation (20°–300° C.) increases to $\geq 110 \times 10^{-7}$ grd$^{-1}$ and does not increase beyond $138 \times 10^{-7}$ grd$^{-1}$.

These objectives have been realized with the glass according to this invention which consist essentially of (wt %)

| | | | |
|---|---|---|---|
| $P_2O_5$ | 65.0–70.00 | preferably | 66.60–69.00 |
| $B_2O_3$ | 0.0–2.00 | " | 1.10–1.75 |
| $SiO_2$ | 0.0–0.75 | " | 0.00–0.65 |
| $Al_2O_3$ | 2.5–6.00 | " | 4.15–5.55 |
| $R_2O$, preferably being | 11.0–17.00 | " | 12.35–15.50 |
| $Li_2O$ | 3.0–6.00 | " | 3.30–4.40 |
| $Na_2O$ | 3.0–6.00 | " | 3.45–4.40 |
| $K_2O$ | 5.5–7.50 | " | 5.60–6.70 |
| as well as | | | |
| MgO | 0.00–1.00 | " | 0.00–0.45 |
| CaO | 0.00–1.50 | " | 0.00–0.80 |
| SrO | 0.00–2.00 | " | 0.00–1.50 |
| BaO | 3.00–9.50 | " | 3.30–6.15 |
| ZnO and/or CdO | 0.00–1.00 | " | 0.00–0.45 |
| $CeO_2$ | 0.45–2.00 | " | 0.45–1.25 |
| $Cl^-$ | 0.15–0.75 | " | 0.15–0.20 |
| $F^-$ | 0.25–1.50 | " | 0.70–1.20 |
| refining agents | | | |
| $As_2O_3$ and/or $As_2O_5$; $Sb_2O_3$; $Sb_2O_5$ | 0.10–2.00 | " | 0.40–0.95 |
| coloring agent CuO | 2.55–6.55 | " | 2.55–5.35 |

The glasses according to this invention can advantageously be smelted in an excellent optical quality in the conventional large platinum smelting units normally used for the production of tinted optical glasses without giving rise to any corrosion of the precious metal (Pt). The maximum dimensions of copper phosphate glass plates which can be produced are generally within a volume of 1000×5–16.0 mm.

Smelting down occurs preferably in Pt. smelting units at temperatures of $\leq 1100°$ C.; the precise conditions depend essentially on the weight proportion of $Al_2O_3$, alkaline earth oxides, $CeO_2$, and $SiO_2$. For a calculated glass quantity of around 500 kg, the smelting process is generally completed in 5 to 6 hours. Refining and degasification of such glass melts is generally effected at temperatures of $\leq 1050°$ C.

After a holding time of about 1 to 2 hours at 950°–850° C. the phosphate glass melt is well homogenized with the aid of agitator equipment specifically adapted to these speciality glasses.

The resulting copper phosphate filter glass is subsequently deformed into broad glass bands, rolled to plate, or press-molded.

Cooling entails no problems in electrically heated furnaces which slowly cool the hot glass down (at the rate of 1° to 4° C. temperature drop per hour) to the normal temperature of about 25° C. and thereby largely eliminate tension.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following examples, the temperatures are set forth uncorrected in degrees Celsius; unless otherwise indicated, all parts and percentages are by weight.

EXAMPLES 1–3

The following table gives three examples from the composition range according to the invention prepared as previously described:

TABLE 1

|  | Example 1 | Example 2 | Example 3 |
| --- | --- | --- | --- |
| $SiO_2$ | — | 0.65% | — |
| $B_2O_3$ | 1.10% | 1.10% | 1.75% |
| $Li_2O$ | 4.40% | 4.50% | 3.30% |
| $Na_2O$ | 4.40% | 4.50% | 3.45% |
| $K_2O$ | 6.70% | 6.50% | 5.60% |
| MgO | — | — | 0.45% |
| CaO | 0.40% | 0.80% | — |
| SrO | — | — | 1.50% |
| BaO | 4.35% | 6.15% | 3.30% |
| ZnO | — | 0.40% | 0.45% |
| $Al_2O_3$ | 4.15% | 4.20% | 5.55% |
| $CeO_2$ | 1.25% | 0.50% | 0.45% |
| $As_2O_3$ | 0.40% | 0.40% | 0.95% |
| $P_2O_5$ | 66.60% | 66.65% | 69.35% |
| $Cl^-$ | 0.20% | 0.20% | 0.15% |
| $F^-$ | 0.70% | 0.70% | 1.20% |
| CuO | 5.35% | 2.75% | 2.55% |
|  | 100.00% | 100.00% | 100.00% |
| Tg | 312° C. | 318.5° C. | 375° C. |
| $\alpha$ (20–300° C.) $\times 10^{-7} grd^{-1}$ | 133.1 | 134.0 | 115.2 |

The accompanying graph represents the transmission curve for Examples 1 and 2 over the whole spectral application range. The transmission curve of Example 3 (not shown) is virtually parallel to that of Example 2 (at a very narrow distance).

The preceding examples can be repeated with similar success by substituting the generically or specifically described reactants and/or operating conditions of this invention for those specifically used in the examples. From the foregoing description, one skilled in the art to which this invention pertains can easily ascertain the essential characteristics thereof and, without departing from the spirit and scope of the present invention, can make various changes and modifications to adapt it to various usages and conditions.

INDUSTRIAL APPLICABILITY

As can be seen from the present specification and examples, the present invention is industrially useful in providing a base glass suitable for the large scale production of highly selective copper oxide filter glasses.

What is claimed is:

1. A phosphate glass rich in alkali and alkaline earth metal oxides and containing CuO as a coloring component for optical filter glass in the spectral range from 350 nm to 850 nm, consisting essentially of the following synthesis-composition (in wt. %):

| | |
| --- | --- |
| $P_2O_5$ | 65.00–70.00 |
| $SiO_2$ | 0.00–0.75 |
| $B_2O_3$ | 0.00–2.00 |
| $Al_2O_3$ | 2.50–6.00 |
| $R_2O$ | 11.00–17.00 |
| BaO | 3.00–9.50 |
| $CeO_2$ | 0.45–2.00 |
| $Cl^-$ | 0.15–0.75 |
| CuO | 2.55–6.55 |
| $F^-$ | 0.25–1.50 |
| Refining Agents | 0.10–2.00 | wherein $R_2O$ is at least one alkali metal oxide.

2. Glass according to claim 1, characterized in that $\Sigma CeO_2 + Al_2O_3 + BaO + CuO \geq 10.45\%$ wt. % and $\Sigma R_2O + F^- + Cl^- \leq 16.9\%$ wt. %.

3. Glass according to claim 1, characterized in that, with 2.75–5.50 wt. % CuO in a 2 mm thick filterglass, UV-transmission at $\lambda = 350$ nm can be maintained between $\geq 69\%$ and $\geq 83\%$; the transmissivity difference of the two color concentrations at $\lambda = 450$ nm is only 1% and does not fall below a transmission of 90%; and the absorption at wavelength $\lambda = 700$ nm increases from $\leq 12\%$ up to $\leq 2.0\%$.

4. Glass according to claim 1, characterized in that the transformation range (Tg) is lower than 380° C. when elongation (20°–300° C.) increases to $\geq 110 \times 10^{-7}$ grd$^{-1}$ and does not increase beyond $138 \times 10^{-7}$ grd$^{-1}$.

5. Glass according to claim 1, characterized in that it contains:
3.0–6.0 wt. % $Na_2O$
5.5–7.5 wt. % $K_2O$
3.0–6.0 wt. % $Li_2O$
0.0–1.0 wt. % MgO
0.0–1.5 wt. % CaO
0.0–2.0 wt. % SrO
0.0–1.0 wt. % ZnO and/or CdO
0.1–2.0 wt. % $As_2O_3$, $Sb_2O_3$ or $Sb_2O_5$.

6. Glass according to claim 2, characterized in that, with 2.75–5.50 wt. % CuO in a 2 mm thick filterglass, UV-transmission at $\lambda = 350$ nm can be maintained between $\geq 69\%$ and $\geq 83\%$; the transmissivity difference of the two color concentrations at $\lambda = 450$ nm is only 1% and does not fall below a transmission of 90%; and the absorption at wavelength $\lambda = 700$ nm increases from $\leq 12\%$ up to $\leq 2.0\%$.

7. Glass according to claim 2, characterized in that the transformation range (Tg) is lower than 380° C. when elongation (20°–300° C.) increases to $\geq 110 \times 10^{-7}$ grd$^{-1}$ and does not increase beyond $138 \times 10^{-7}$ grd$^{-1}$.

8. Glass according to claim 2, characterized in that it contains:

3.0–6.0 wt. % $Na_2O$
5.5–7.5 wt. % $K_2O$
3.0–6.0 wt. % $Li_2O$
0.0–1.0 wt. % MgO
0.0–1.5 wt. % CaO
0.0–2.0 wt. % SrO
0.0–1.0 wt. % ZnO and/or CdO
0.1–2.0 wt. % $As_2O_3$, $Sb_2O_3$ or $Sb_2O_5$.

9. Glass according to claim 1, characterized in that:
(a) with 2.75–5.50 wt. % CuO in a 2 mm thick filterglass, UV-transmission at $\lambda = 350$ nm can be maintained between $\geq 69\%$ and $\geq 83\%$; the transmissivity difference of the two color concentrations at $\lambda = 450$ nm is only 1% and does not fall below a transmission of 90%; and the absorption at wavelength $\lambda = 700$ nm increases from $\leq 12\%$ up to $\leq 2.0\%$; and
(b) the transformation range (Tg) is lower than 380° C. when elongation (20°–300° C.) increases to $\geq 110 \times 10^{-7}$ grd$^{-1}$ and does not increase beyond $138 \times 10^{-7}$ grd$^{-1}$.

10. Glass according to claim 8, characterized in that, with 2.75–5.50 wt. % CuO in a 2 mm thick filterglass, UV-transmission at $\lambda = 350$ nm can be maintained between $\geq 69\%$ and $\geq 83\%$; the transmissivity difference of the two color concentrations at $\lambda = 450$ nm is only 1% and does not fall below a transmission of 90%; and the absorption at wavelength $\lambda = 700$ nm increases from $\geq 12\%$ up to $\geq 2.0\%$.

11. Glass according to claim 8, characterized in that the transformation range (Tg) is lower than 380° C. when elongation (20°–300° C.) increases to $\geq 110 \times 10^{-7}$ grd$^{-1}$ and does not increase beyond $138 \times 10^{-7}$ grd$^{-1}$.

12. Glass according to claim 1 consisting essentially of the following composition:

| | |
|---|---|
| $P_2O_5$ | 66.60–69.00 |
| $B_2O_3$ | 1.10–1.75 |
| $SiO_2$ | 0.00–0.65 |
| $Al_2O_3$ | 4.15–5.55 |
| $R_2O$, being | 12.35–15.50 |
| $Li_2O$ | 3.30–4.40 |
| $Na_2O$ | 3.45–4.40 |
| $K_2O$ | 5.60–6.70 |
| as well as | |
| MgO | 0.00–0.45 |
| CaO | 0.00–0.80 |
| SrO | 0.00–1.50 |
| BaO | 3.30–6.15 |
| ZnO and/or CdO | 0.00–0.45 |
| $CeO_2$ | 0.45–1.25 |
| Cl$^-$ | 0.15–0.20 |
| F$^-$ | 0.70–1.20 |
| refining agents | |
| $As_2O_3$ and/or $As_2O_5$; $Sb_2O_3$; $Sb_2O_5$ | 0.40–0.95 |
| coloring agent CuO | 2.55–5.35 |

13. Glass according to claim 5 having a Tg of about 312° C. and $\alpha(20°–300°$ C.$)\times 10^{-7}$grd$^{-1}$ of about 133.1 consisting essentially of the following composition:

| | |
|---|---|
| $B_2O_3$ | 1.10% |
| $Li_2O$ | 4.40% |
| $Na_2O$ | 4.40% |
| $K_2O$ | 6.70% |
| CaO | 0.40% |
| BaO | 4.35% |
| $Al_2O_3$ | 4.15% |
| $CeO_2$ | 1.25% |
| $As_2O_3$ | 0.40% |
| $P_2O_5$ | 66.60% |
| Cl$^-$ | 0.20% |
| F$^-$ | 0.70% |
| CuO | 5.35% |

14. Glass according to claim 5 having a Tg of about 318.5° C. and $\alpha(20°–300°$ C.$)\times 10^{-7}$grd$^{-1}$ of about 134.0 consisting essentially of the following composition:

| | |
|---|---|
| $SiO_2$ | 0.65% |
| $B_2O_3$ | 1.10% |
| $Li_2O$ | 4.50% |
| $Na_2O$ | 4.50% |
| $K_2O$ | 6.50% |
| CaO | 0.80% |
| BaO | 6.15% |
| ZnO | 0.40% |
| $Al_2O_3$ | 4.20% |
| $CeO_2$ | 0.50% |
| $As_2O_3$ | 0.40% |
| $P_2O_5$ | 66.65% |
| Cl$^-$ | 0.20% |
| F$^-$ | 0.70% |
| CuO | 2.75% |

15. Glass according to claim 5 having a Tg of about 375° C. and $\alpha(20°–300°$ C.$)\times 10^{-7}$grd$^{-1}$ of about 115.2 consisting essentially of the following composition:

| | |
|---|---|
| $B_2O_3$ | 1.75% |
| $Li_2O$ | 3.30% |
| $Na_2O$ | 3.45% |
| $K_2O$ | 5.60% |
| MgO | 0.45% |
| SrO | 1.50% |
| BaO | 3.30% |
| ZnO | 0.45% |
| $Al_2O_3$ | 5.55% |
| $CeO_2$ | 0.45% |
| $As_2O_3$ | 0.95% |
| $P_2O_5$ | 69.35% |
| Cl$^-$ | 0.15% |
| F$^-$ | 1.20% |
| CuO | 2.55% |

* * * * *